(12) United States Patent
Krause et al.

(10) Patent No.: US 7,076,670 B1
(45) Date of Patent: Jul. 11, 2006

(54) TWO STAGE POWER SUPPLY CIRCUIT FOR INDEPENDENTLY SUPPLYING POWER TO FIRST AND SECOND COMPONENTS OF A DIGITAL PROCESSING SYSTEM

(75) Inventors: Peter Krause, Singapore (SG); Phuan Boon Chong, Perling (MY)

(73) Assignee: Apple Computer, Inc., Cupertino, CA (US)

( * ) Notice: Subject to any disclaimer, the term of this patent is extended or adjusted under 35 U.S.C. 154(b) by 462 days.

(21) Appl. No.: 09/656,504

(22) Filed: Sep. 7, 2000

(51) Int. Cl.
*G06F 1/26* (2006.01)

(52) U.S. Cl. .................................... 713/300
(58) Field of Classification Search ............ 713/300, 713/320, 324, 330, 310; 345/211, 212; 363/21.04, 363/21.12, 16, 26
See application file for complete search history.

(56) References Cited

U.S. PATENT DOCUMENTS

| | | | | |
|---|---|---|---|---|
| 5,347,163 A | * | 9/1994 | Yoshimura | ................. 307/66 |
| 5,806,006 A | * | 9/1998 | Dinkins | ....................... 455/574 |
| 5,835,360 A | * | 11/1998 | Jansen | ..................... 363/21.04 |
| 5,898,232 A | * | 4/1999 | Reents et al. | ................. 307/18 |
| 5,938,770 A | * | 8/1999 | Kim | .......................... 713/300 |
| 6,049,880 A | * | 4/2000 | Song | .......................... 713/300 |
| 6,140,714 A | * | 10/2000 | Fujii | .......................... 307/18 |
| 6,330,169 B1 | * | 12/2001 | Mullett et al. | ............... 363/16 |
| 6,345,364 B1 | * | 2/2002 | Lee | ........................... 713/324 |

FOREIGN PATENT DOCUMENTS

WO    WO-96-25786    *  8/1996

OTHER PUBLICATIONS

"DC-DC Converter Basics" http://www.powerdesigners.com/Info/Web/design_center/articles/DC-DC/converter.shtm 1998.*

* cited by examiner

*Primary Examiner*—Lynne H. Browne
*Assistant Examiner*—Paul Yanchus, III
(74) *Attorney, Agent, or Firm*—Blakely, Sokoloff, Taylor & Zafman LLP

(57) ABSTRACT

A power supply circuit for a digital processing system. A first stage of the power supply circuit is used to generate power for a first component of the digital processing system and to drive a second stage of the power supply circuit. The second stage of the power supply circuit supports a second component of the digital processing system. The first and second stages of the power supply circuit are electrically connected to each other.

19 Claims, 7 Drawing Sheets

TWO STAGE POWER SUPPLY CIRCUIT FOR INDEPENDENTLY SUPPLYING POWER TO FIRST AND SECOND COMPONENTS OF A DIGITAL PROCESSING SYSTEM

BACKGROUND OF THE INVENTION

1. Field of the Invention

The present invention relates generally to power supply topographies, and more specifically to power supply topographies for digital processing systems.

2. Background Information

It is well known that digital processing systems, such as personal computer systems, require a power supply in order to operate. In fact, it is common for the display device (e.g., video monitor) and central processing unit (CPU) of a "separated" personal computer system to be powered by separate power supplies. In a separated personal computer system, the display device is separate from the housing containing the CPU.

Even in "all-in-one" personal computer systems, in which the display device and CPU are housed in the same enclosure, a separate power supply is used for each of the display device and the CPU. In all-in-one computer systems, the power supply for the CPU is not necessarily located on the same printed circuit board that features the CPU which is located at main logic board (MLB). If the power supply is not located on the MLB along with the CPU, a group of cables is needed to connect such an off-board power supply to the MLB such that the necessary voltages can be supplied to components, such as the CPU, on the MLB. However, the cables used to connect the power supply to the MLB are not only relatively large and costly but they also require a noise rejecting filter to be placed at the junction between the cables and the MLB. Thus, using an off-board power supply and associated cables increases the cost and complexity of the system.

A commonly used power supply for a display device is a flyback converter. Flyback converters are generally used to generate relatively high voltages at low current. A basic circuit diagram of a flyback converter is shown in FIG. 1A. In a flyback converter, energy is stored in a transformer 105 during the power switch on time. During such time, the load current is supplied from an output filter capacitor 110. When the power transistor turns off, the energy stored in the power transformer 105 is transferred to the output load and replenishes the charge in the filter capacitor 110. A controller circuit 115 provides the necessary control and drive signals (base/gate drive signals) for switch 120. Diode 125 and capacitor 130 represent a conventional bridge rectification and capacitive filter needed to produce a high voltage DC supply for the flyback converter.

A commonly used power supply for a CPU is a forward converter, which is also referred to as a down converter. Forward converters are generally used to generate relatively low voltages at high current. A basic circuit diagram of a forward converter is shown in FIG. 1B. A forward converter is a switching power supply in which the energy is transferred from the input to the output during the on state of the primary switching device 150. A winding 155 of transformer 160 is phased so that energy will be transferred to the output and stored in the output choke 165 when the power transistor is on. When the power transistor turns off, the energy stored in the output choke is transfer to the output load. A controller circuit 180 provides the necessary control and drive signals (base/gate drive signals) for switch 150.

Generally, two independent power supplies are used to generate the power needed to drive a display and a CPU in an all-in-one computer system. The independent power supplies typically share only a few components related to the AC input and the AC electromagnetic compatibility (EMC) filter circuitry. FIG. 1C illustrates a basic block diagram of two independent power supplies 185 and 190 which provide power to a display 187 and a CPU (not shown) located on a printed circuit board, such as main logic board (MLB) 195. The independent power supply which drives the display 187 is a flyback converter 185, and the independent power supply which drives the CPU is a forward converter 190. Forward converter 190 is shown located apart from MLB 195. Thus, a group of cables 191 is needed to connect forward converter 190 to MLB 195 such that the necessary voltages can be supplied to components on MLB 195. A noise rejecting filter 193 is used at the junction between cables 191 and MLB 195.

SUMMARY OF THE INVENTION

The present invention provides a power supply circuit for a digital processing system. In one embodiment of the present invention, the power supply circuit includes a first stage associated with a first component of the digital processing system, and a second stage associated with a second component of the digital processing system. The first stage drives the second stage.

In another embodiment, the first component comprises a display device and is powered by the first stage, and the second component comprises a CPU and is powered by the second stage. The first stage includes a flyback converter and the second stage includes a portion of a forward converter.

Additional features and benefits of the present invention will become apparent upon review of the following description.

BRIEF DESCRIPTION OF THE DRAWINGS

Various embodiments of the present invention will be described in detail with reference to the following drawings. The present invention is illustrated by way of example and not limitation in the accompanying figures.

DETAILED DESCRIPTION

The following description provides embodiments of the present invention. However, it will be appreciated that other embodiments of the present invention will become apparent to those of ordinary skill in the art upon examination of this description. Thus, the present description and accompanying drawings are for purposes of illustration and are not to be used to construe the invention in a restrictive manner.

A first stage of a power supply circuit is used to generate the power needed to drive a display and a main logic board in an all-in-one computer system. In one embodiment of the present invention, the first stage is a flyback converter which is used to generate the supply voltages for the display. A second stage of the power supply circuit is driven by the first stage to provide power to components, such as the central processing unit (CPU), on the main logic board (MLB). In one embodiment of the present invention, the second stage is the final stage of a forward converter. The second stage is compact enough to be mounted directly onto the MLB to provide more direct power distribution to the components on the MLB without using large, costly cables. Furthermore, the second stage may be located within a shielded MLB enclosure to eliminate the need for any additional electromagnetic containment (EMC) measures. By generating power at an initial source and using that power to drive the main components of an all-in-one computer system, the cost of the system may be reduced and the design of the system may be simplified with an overall increased efficiency.

Figure 1A:
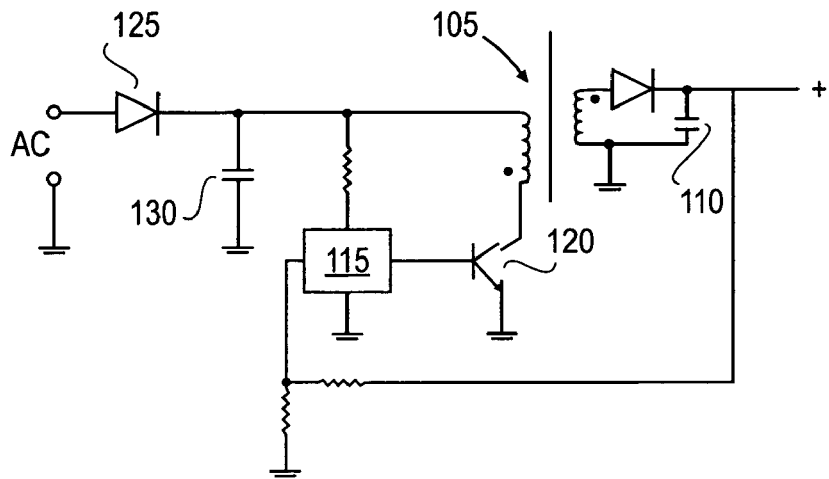
FIG. 1A illustrates generally a circuit diagram of a flyback converter.
Figure 1B:
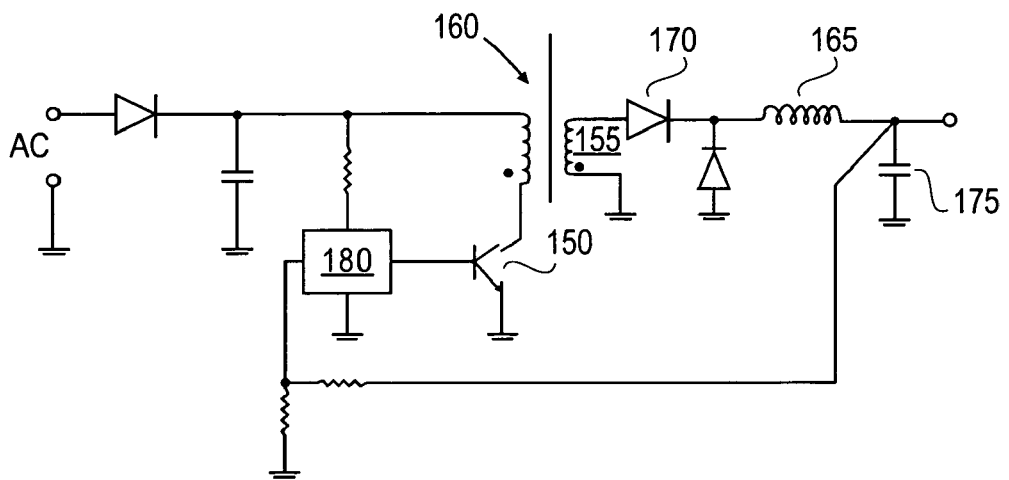
FIG. 1B illustrates generally a circuit diagram of a forward converter.
Figure 1C:
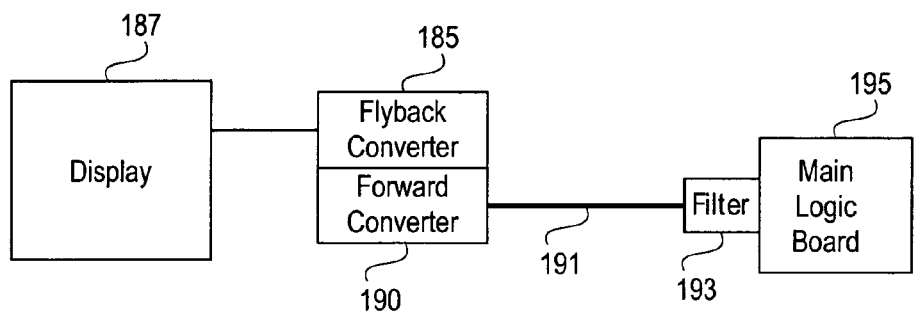
FIG. 1C illustrates a basic block diagram of a prior art power supply topography for a computer system.
Figure 2:
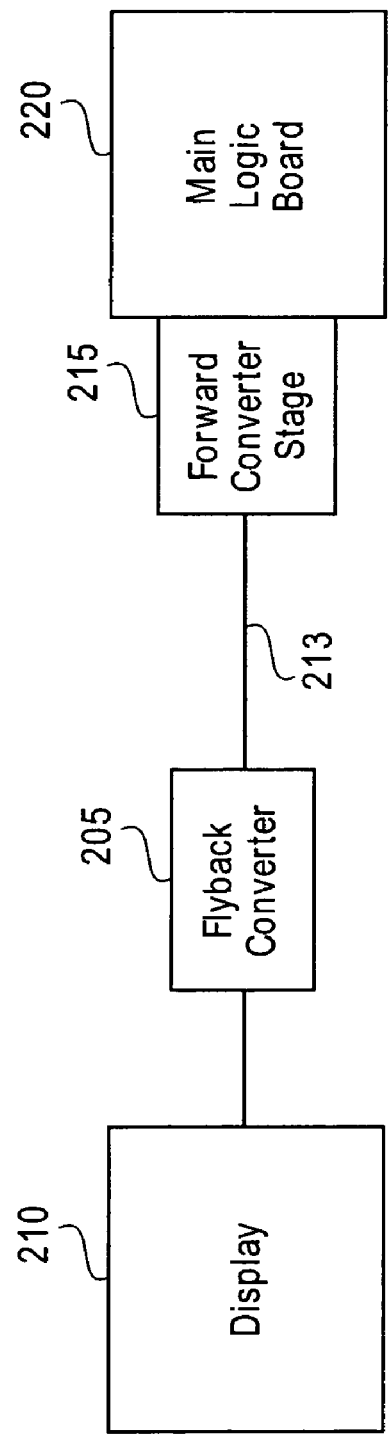
FIG. 2 illustrates a basic block diagram of a power supply topography for a computer system in accordance with the teachings of the present invention.

FIG. 2 illustrates a basic block diagram of a power supply configuration in accordance with the teachings of the present invention. A flyback converter 205 provides power directly to a display 210, such as a CRT display. Flyback converter 205 may be located near display 210. Flyback converter 205 is coupled to a forward converter stage 215, which is located on or adjacent a MLB 220. In one embodiment of the present invention, forward converter stage 215 is the final stage of a forward converter. Flyback converter 205 drives forward converter stage 215 via a connector 213, which may be, for example, a two wire bus. Thus, forward converter stage 215 is able to provide power to components, such as a CPU, on the MLB 220. Flyback converter 205 is able to provide power to display 210 and drive forward converter stage 215 such that power may be provided to components on MLB 220. Although it is not necessary to place forward converter stage 215 on or adjacent MLB 220, placing forward converter stage 215 on MLB 220 allows forward converter stage 215 to be located within an EMC enclosure coupled to MLB 220.

Although the present disclosure discusses the use of flyback converters and forward converters, it should be noted that flyback converters and forward converters are only examples of power supply components that may be used as part of the present invention.

Figure 3:
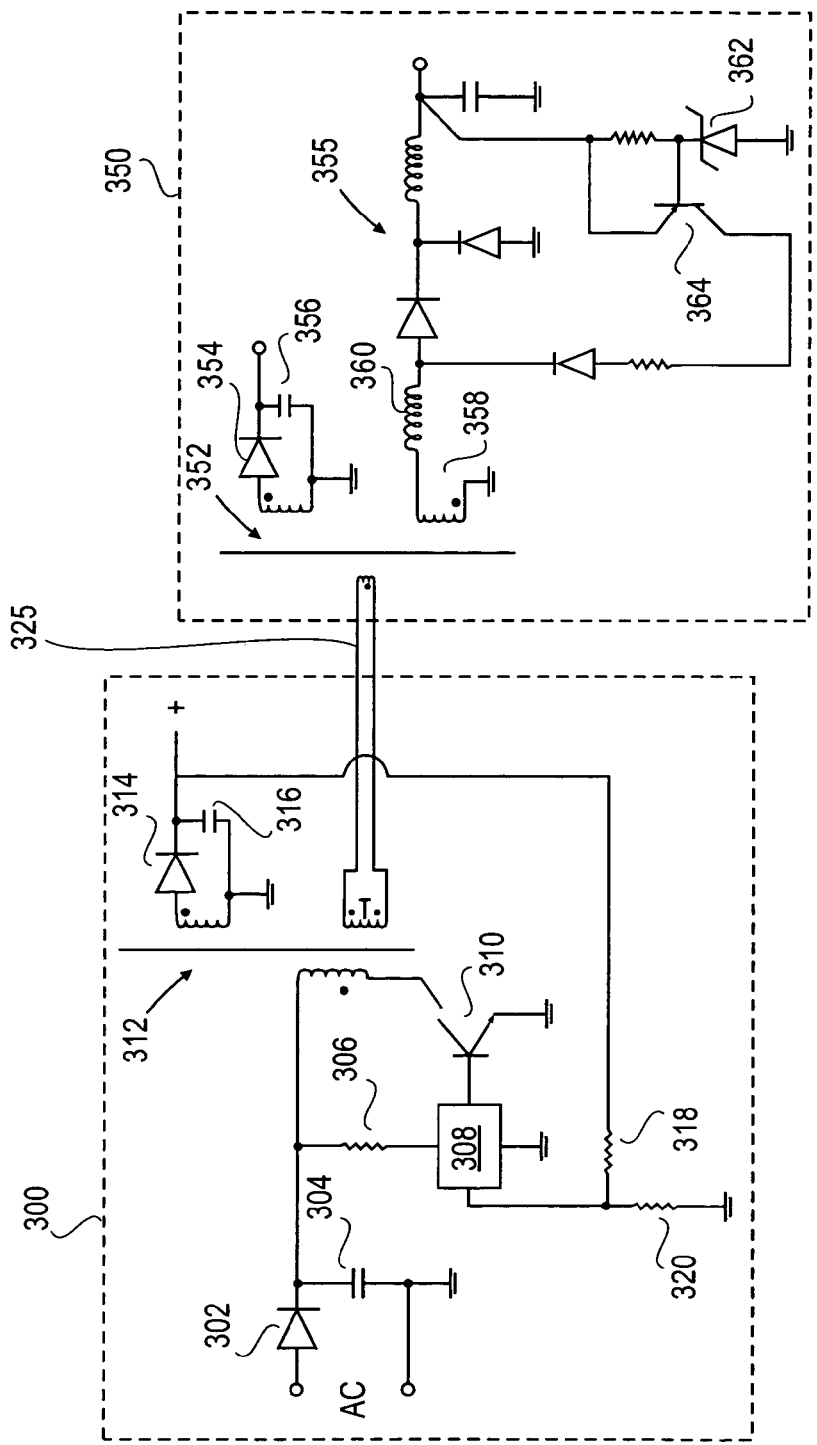
FIG. 3 illustrates a circuit diagram of a power supply circuit in accordance with the teachings of the present invention.

FIG. 3 illustrates a circuit diagram of a two stage power supply circuit according to one embodiment of the present invention. A first stage 300 includes a flyback converter and is capable of generating high voltages at low current. For example, 127V may be generated at 0.3 A for the horizontal scanning and EHT generator, 80V may be generated at 0.2 A for the video output, and 12V at 0.8 A and 6.3V at 0.6 A may be generated for the small signal processing. First stage 300 is associated with and provides power to a display device. A second stage 350 includes the final stage 355 of a forward converter and is capable of generating low voltages at high current. For example, 12V may be generated at 4 A, 5V may be generated at 6 A and 3.3V may be generated at 10 A. Second stage 350 is associated with and provides power to components on a MLB. In one embodiment, first stage 300 and second stage 350 are located apart from each other but are electrically connected to each other by a two wire bus 325. Second stage 350 may be mounted directly onto the MLB to take advantage of EMC features of the MLB, such as an EMC enclosure coupled to the MLB.

Diode 302 and capacitor 304 represent a bridge rectification and capacitive filter used to produce a high voltage DC supply for first stage 300. Resistor 306 is used to regulate the power used to start up first stage 300. Controller circuit 308 provides control and drive signals (base/gate drive signals) for switch 310. Transformer 312 is designed for flyback operation, as first stage 300 uses a flyback converter to generate power and drive second stage 350. Because transformer 312 is designed for flyback operation, first stage 300 can provide the voltages necessary to drive a display device. For example, a 6.3V output may be used for a CRT heater and a 127V output may be used for horizontal deflection. Furthermore, flyback converter can provide substantially constant output voltages over a wide range of load current and AC input voltages (e.g., 85 to 265V AC).

A secondary voltage is rectified by diode 314, and capacitor 316 acts as a capacitive filter. Voltage feedback, which is a portion of the output voltage, is used by controller circuit 308 to control the on and off times of switch 310. The feedback voltage is developed across a resistor divider formed by resistors 318 and 320 such that the correct feedback signal for controller circuit 308 may be generated.

Two wire bus 325 is coupled to first stage 300 as a winding on flyback transformer 312 to drive the final stage 355 of a forward converter in second stage 350, which is located apart from first stage 300. In one embodiment, two wire bus 325 carries approximately 48V AC at high frequencies (e.g., 60 kHz to 100 kHz) and is differentially driven by flyback transformer 312. This provides an effective way to decouple first stage 300 and second stage 350 to account for common noise. A common ferrite or coil may be added into two wire bus 325 to block common current without affecting the performance of two wire bus 325. This helps to prevent EMI from leaking out of the EMC enclosure coupled to the MLB.

Transformer 352 is the input transformer of second stage 350. Using a transformer again helps to reduce common mode noise, particularly noise coming from the CPU supply lines going back to the flyback converter. Furthermore, by using a second transformer, the power supply circuit of the present invention may be used to generate regulated auxiliary output voltages, without any additional feedback control circuitry, if the windings of transformer 352 are phased for flyback operation.

A DC output voltage of second stage 350 is rectified by diode 354, and capacitor 356 acts as a capacitive filter. It should be noted that the load regulation for the DC output voltages of second stage 350 is typically only as good as the load regulation for normal flyback operation. A linear regulator may be used to improve load regulation. It should be further noted that a forward converter based design is used for second stage 350 such that the main supply voltages (e.g., 3.3V and 5V) of second stage 350 may be generated at higher load currents.

Winding 358 of transformer 352 generates a low voltage, high current output, while inductor 360 provides voltage regulation. Inductor 360 acts similar to a magnetic pulse-width modulator, providing voltage regulation by secondary pulse-width modulation. As soon as an output voltage attempts to exceed the voltage of Zener diode 362, switch 364 is moved to an ON position, which increases the reset time/current of the core. If an additional output voltage is desired, an additional winding and regulator circuit (e.g., components similar to those coupled to winding 358) may be added, or a split winding (see FIGS. 5A and 5B) may be used.

Transformer 352 provides the appropriate energy level through the turn ratio between the input winding of transformer 352 and the output windings (e.g., winding 358) of transformer 352. In one embodiment, the output windings produce sufficient energy to ensure regulation with the minimum duty cycle of a 48V AC carried by two wire bus 325.

By using a flyback converter in a first stage of a power supply circuit to drive a portion of a forward converter in a second stage, the power supply topography for a computer system may be simplified and overall system efficiency may be improved. Because only the final stage of a forward converter is used in the second stage in one embodiment of the present invention, the second stage may be placed on the main logic board of a computer system, in closer proximity to the CPU. This eliminates the need to use a high current, common mode noise rejecting filter when connecting power cables to the main logic board. Any remaining common mode noise that is not cancelled by the transformer of the second stage may be addressed by placing a small filter on the input wires of the second stage.

Although FIG. 3 illustrates a two stage power supply circuit, it is appreciated that the present invention is not limited to having only two stages. A number of stages may be used as long as at least one stage is driving one or more dependent stages.

Figure 4:
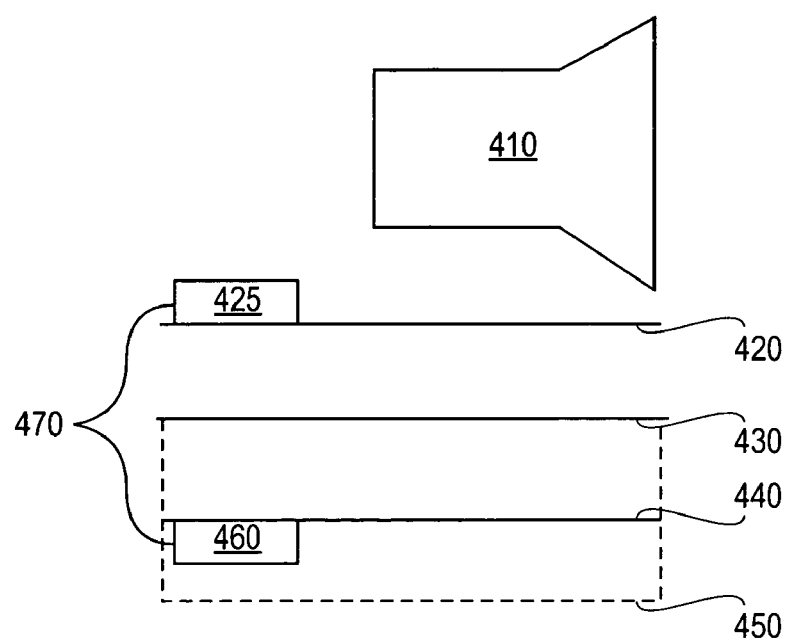
FIG. 4 illustrates generally an internal side view of an all-in-one computer system having a two stage power supply circuit in accordance with the teachings of the present invention.

FIG. 4 illustrates generally an internal side view of an all-in-one computer system having a two stage power supply topography according to one embodiment of the present invention. A display device 410 is located adjacent a first PCB 420. A first power supply stage 425 is located on first PCB 420 and provides power to display device 410. In one embodiment of the present invention, first power supply stage 425 includes a flyback converter. An intermediate substrate 430 is located below first PCB 420. Substrate 430 forms the upper part of the EMC enclosure 450 and may also be used as a support plate and/or a heat exchanging plate. A main logic board 440 is located below intermediate substrate 430. A CPU is coupled to main logic board 440. An EMC enclosure 450 provides electromagnetic conformance for main logic board 440 and encloses a second power supply stage 460 mounted directly onto main logic board 440. Second power supply stage 460 provides power to the CPU and other components on main logic board 440. In one embodiment, second power supply stage 460 includes a final stage of a forward converter. A group of wires 470, such as a two wire bus, connects first power supply stage 425 to second power supply stage 460 to allow first power supply stage 425 to drive second power supply stage 460. A housing (not shown) encloses all of the features shown in FIG. 4 and provides a viewing area for the screen of display device 410 to be viewed by a user.

Figure 5A:
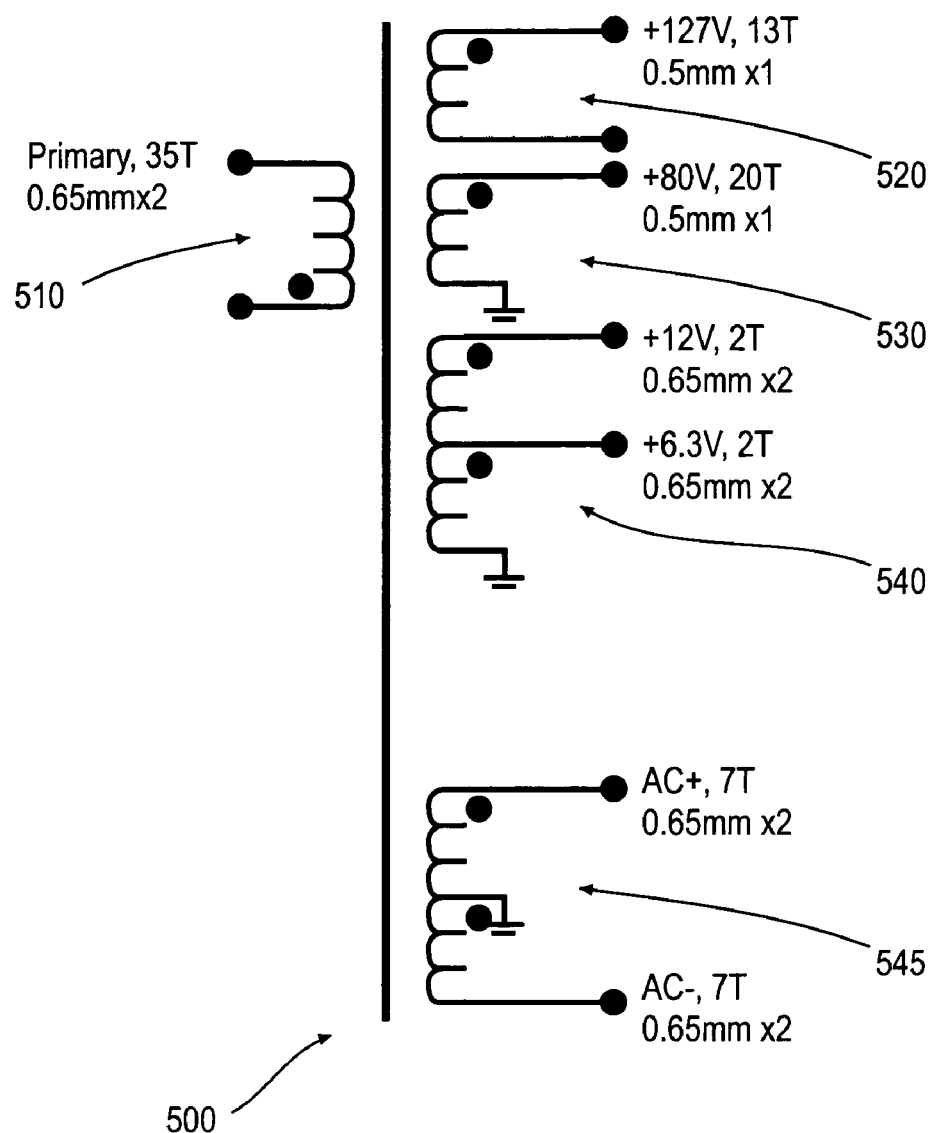
FIG. 5A illustrates a transformer which may be used in the first stage of a power supply circuit in accordance with the teachings of the present invention.

FIG. 5A illustrates one embodiment of a transformer which may be used in the first stage of a power supply circuit, such as the one shown in FIG. 3. Transformer 500 has an input winding 510 configured as indicated. Output voltages are provided by output windings 520, 530 and 540. It should be noted that output winding 540 is a split winding and provides two different output voltages (12V and 6.3V). The relatively high output voltages of transformer 500 may be used to provide power to a display device. Output winding 545 provides the AC input for a two wire bus, such as two wire bus 325.

Figure 5B:
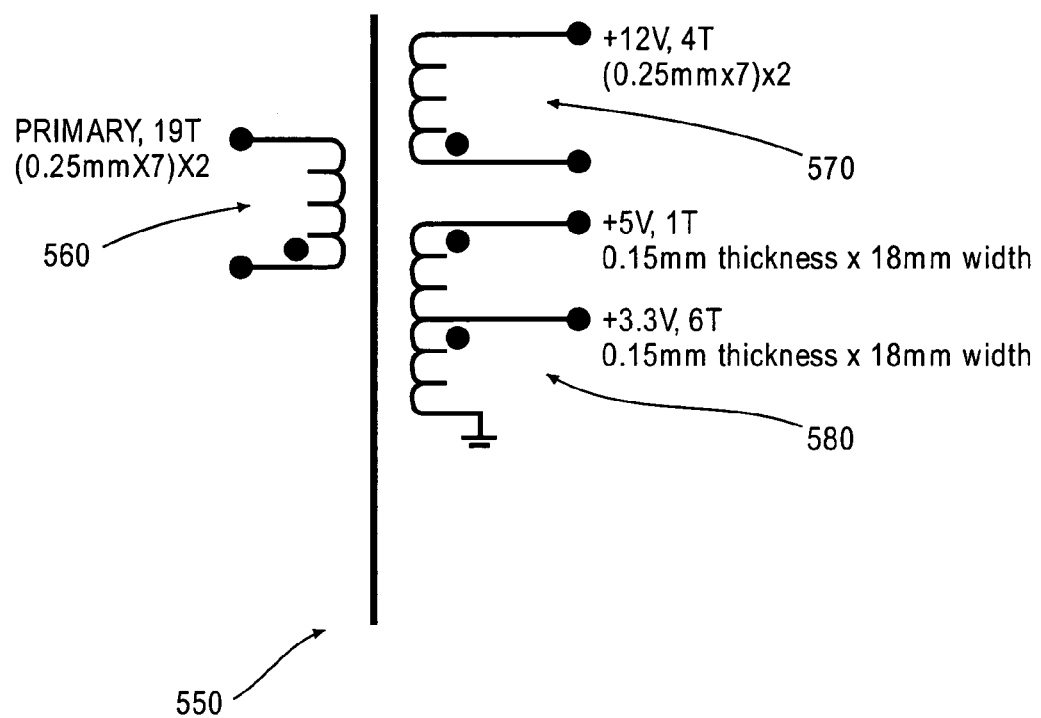
FIG. 5B illustrates a transformer which may be used in the second stage of a power supply circuit in accordance with the teachings of the present invention.

FIG. 5B illustrates one embodiment of a transformer which may be used in the second stage of a power supply circuit, such as the one shown in FIG. 3. Transformer 550 has an input winding 560 configured as indicated. Input winding 560 is one end of a two wire bus, which, for example, may connect transformers 500 and 550. Split winding 545 may be the other end of the two wire bus. Output voltages are provided by output windings 570 and 580. It should be noted that output winding 580 is a split winding and provides two different output voltages (5V and 3.3V). The relatively low output voltages of transformer 550 may be used to provide power to components (e.g., a CPU) on a MLB.

In the foregoing detailed description, the apparatus and method of the present invention have been described with reference to specific exemplary embodiments. However, it will be evident that various modifications and changes may be made without departing from the broader scope and spirit of the present invention. The present specification and figures are accordingly to be regarded as illustrative rather than restrictive.

What is claimed is:

1. A power supply circuit for a digital processing system, the circuit comprising:
   a first stage having a first output coupled to a first component of the digital processing system, and a second output which is different from the first output, wherein said second output has an output winding;
   a second stage associated with a second component of the digital processing system, and having an input winding, wherein said input winding of said second stage is directly connected to said output winding of said first stage through a two wire bus; and
   wherein said first stage drives said second stage using the direct two-wire bus connection between said output winding of the second output and said input winding of said second stage, wherein the second stage transforms the second output to generate a third output to drive the second component, and wherein the first output is independent of the second stage.

2. The circuit of claim 1, wherein said first and second stages are separated from each other.

3. The circuit of claim 1, wherein said two wire bus is differentially driven by said first stage.

4. The circuit of claim 2, wherein said first component comprises a display device and said second component comprises a microprocessor.

5. The circuit of claim 4, wherein said first stage is located proximately to said display device and said second stage is located proximately to said microprocessor.

6. The circuit of claim 1, wherein said first stage provides power for said first component and said second stage provides power for said second component.

7. The circuit of claim 6, wherein said first stage comprises a flyback converter and said second stage comprises a portion of a forward converter.

8. The power supply circuit of claim 1, wherein said first output provides a direct (DC) voltage, and wherein said second output provides an alternating current (AC) voltage.

9. A power supply circuit for a computer system, the circuit comprising:
   a first circuit having a first output capable of providing power to a first component of the computer system and a second output which is different from the first output, wherein said second output has an output winding; and a second circuit having an input winding and capable of providing power to a second component of the computer system, wherein said input winding of said second circuit is directly connected to said output winding of said first circuit through a two wire bus;

wherein said first circuit drives the second circuit through the direct two-wire bus connection between said output winding of the second output and said input winding of said second stare, wherein the second circuit transforms the second output to generate a third output to drive the second component, and wherein the first output is independent of the second circuit.

10. The circuit of claim 9, wherein said second circuit and said second component are disposed on a printed circuit board.

11. The circuit of claim 9, wherein said first circuit is located within an enclosure of the computer system and proximately to said first component, and wherein said second circuit is located within said enclosure and proximately to said second component.

12. The circuit of claim 11, wherein said first component comprises a display device and said second component comprises a microprocessor.

13. The circuit of claim 9 wherein said first circuit comprises a flyback converter and said second circuit comprises a final stage of a forward converter.

14. The power supply circuit of claim 9, wherein said first output provides a direct current (DC) voltage and said second output provides an alternating current (AC) voltage.

15. A computer system comprising:

a power supply circuit coupled to a display device and a microprocessor of the computer system, wherein said power supply circuit is capable of supplying power to said display device and said microprocessor using at least two distinct power supply stages;

a main circuit having a first output and a second output, wherein said main circuit is coupled to said display device using said first output; and a secondary circuit coupled to said microprocessor, said secondary circuit having an input winding, wherein said second output is directly connected to said input winding through a two wire bus; and wherein said main circuit drives said secondary circuit using the direct two-wire bus connection between said output winding of said second output which is different from the first output, and said input winding of said second stage, wherein said secondary circuit transforms said second output to generate a third output to drive the microprocessor, and wherein the first output is independent of the secondary circuit.

16. The computer system of claim 15, wherein one of said at least two distinct power supply stages includes said main circuit, and wherein another of said at least two distinct power supply stages includes said secondary circuit.

17. The computer system of claim 15, wherein said main circuit and said secondary circuit are physically isolated from each other.

18. The computer system of claim 17, wherein said main circuit and said secondary circuit are electrically coupled to each other.

19. The computer system of claim 15, wherein said main circuit comprises a flyback converter and said secondary circuit comprises a portion of a forward converter.

* * * * *